US009575258B2

(12) United States Patent
Pedut et al.

(10) Patent No.: US 9,575,258 B2
(45) Date of Patent: Feb. 21, 2017

(54) SWITCHING PATCH CORD FIBERS (71) Applicant: Wave2Wave Solution Inc., Milpitas, CA (US)

(72) Inventors: Hai Pedut, Haifa (IL); Yossi Halfon, Givon Hahadasha (IL); Amnon Segal, Tel Mond (IL); Ariel Yemini, Jerusalem (IL); Yonatan Silberman, Shoham (IL)

(73) Assignee: Wave2Wave Solution Inc., Milpitas, CA (US)

( * ) Notice: Subject to any disclaimer, the term of this patent is extended or adjusted under 35 U.S.C. 154(b) by 2 days.

(21) Appl. No.: 14/653,279

(22) PCT Filed: Dec. 8, 2013

(86) PCT No.: PCT/IL2013/051007
§ 371 (c)(1),
(2) Date: Jun. 18, 2015

(87) PCT Pub. No.: WO2014/097291
PCT Pub. Date: Jun. 26, 2014

(65) Prior Publication Data
US 2015/0331200 A1 Nov. 19, 2015

Related U.S. Application Data (60) Provisional application No. 61/739,749, filed on Dec. 20, 2012.

(51) Int. Cl.
*G02B 6/26* (2006.01)
*G02B 6/42* (2006.01)
(Continued)

(52) U.S. Cl.
CPC ............. *G02B 6/3504* (2013.01); *G02B 6/356* (2013.01); *G02B 6/3508* (2013.01);
(Continued)

(58) Field of Classification Search
CPC ..... G02B 6/3546; G02B 6/356; G02B 6/3504; G02B 6/3508; G02B 6/3604; G02B 6/3825; G02B 6/3628
(Continued)

(56) References Cited

U.S. PATENT DOCUMENTS 5,436,987 A 7/1995 Saito
5,613,021 A 3/1997 Saito
(Continued)

OTHER PUBLICATIONS

International Search Report of International Application No. PCT/IL2013/051007 dated Mar. 30, 2014.

*Primary Examiner* — Kaveh C Kianni
*Assistant Examiner* — Hung Lam
(74) *Attorney, Agent, or Firm* — Pearl Cohen Zedek Latzer Baratz LLP (57) ABSTRACT Provided herein are switching methods and systems for switching a patch cord fiber in a fiber management system having non-tensioned patch cord fibers, from a first adapter to a second adapter. Switching comprises disconnecting the patch cord fiber connector from the first adapter; distinguishing the disconnected patch cord fiber, at a region removed from the connector, from other patch cord fibers according to a position of the patch cord fiber in the fiber management system; pulling the distinguished patch cord fiber at the handling region to receive and clasp the disconnected connector, wherein the pulling is carried out to disentangle the pulled patch cord fiber from the other patch cord fibers; and connecting the clasped connector to the second adapter. The patch cord fibers are thus manages at edges thereof only, with no slack control required.

20 Claims, 11 Drawing Sheets (51) Int. Cl.
    *G02B 6/35* (2006.01)
    *G02B 6/38* (2006.01)
(52) U.S. Cl.
    CPC ......... *G02B 6/3556* (2013.01); *G02B 6/3574* (2013.01); *G02B 6/3895* (2013.01); *G02B 6/3898* (2013.01)
(58) Field of Classification Search
    USPC .......................... 385/16, 17, 25, 46, 50, 53
    See application file for complete search history.

(56) References Cited

U.S. PATENT DOCUMENTS

| | | | |
|---|---|---|---|
| 5,764,043 A | 6/1998 | Czosnowski | |
| 5,784,515 A | 7/1998 | Tamaru | |
| 6,256,443 B1 | 7/2001 | Uruno | |
| 2010/0046885 A1 | 2/2010 | Chen | |
| 2012/0308178 A1* | 12/2012 | Chu | G02B 6/38 385/16 |

* cited by examiner

SWITCHING PATCH CORD FIBERS

CROSS-REFERENCE TO RELATED APPLICATIONS

This application is a National Phase Application of PCT International Application No. PCT/IL2013/051007, International Filing Date Dec. 8, 2013, claiming priority of U.S. Patent Application No. 61/739,749, filed Dec. 20, 2012, which is hereby incorporated by reference.

BACKGROUND

1. Technical Field

The present invention relates to the field of fiber management systems, and more particularly, to a patch cord fiber switching method.

2. Discussion of Related Art

Patch cord fiber switching systems manage the challenge of arbitrarily switching patch cord fibers while maintaining control of all patch cord fibers by elaborate designs for monitoring tensioned patch cord fibers and managing patch cord fiber slacks. Examples are presented by WIPO Publication No. 02/43432, U.S. Pat. No. 7,813,600, U.S. Patent Publication No. 2009/0097797 and WIPO Publication No. 2011/013090, which are incorporated herein by reference in their entirety, and disclose various switching arrangements with tensioned fibers and slack management systems.

BRIEF SUMMARY

One aspect of the present invention provides a method of switching, from a first adapter to a second adapter, a patch cord fiber in a fiber management system having a plurality of non-tensioned patch cord fibers, the patch cord fiber having a connector connected at the first adapter, the method comprising: disconnecting the connector from the first adapter; distinguishing the disconnected patch cord fiber, at a region removed from the connector, from other patch cord fibers according to a position of the patch cord fiber in the fiber management system; pulling the distinguished patch cord fiber at the handling region to receive and clasp the disconnected connector, wherein the pulling is carried out to disentangle the pulled patch cord fiber from the other patch cord fibers; and connecting the clasped connector to the second adapter.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION

Prior to setting forth the detailed description, it may be helpful to set forth definitions of certain terms that will be used hereinafter. The term "patch cord fiber" as used herein in this application refers to a fiber that serves as an intermediate, i.e. as a patch cord, in a switching system. The terms "connector" and "adapter" as used herein in this application refers to the end part of the patch cord fiber and to its socket in the switching system, respectively.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIGS. 1A-1E are high level schematic illustrations of a fiber management system 95 comprising a patch cord fiber switching system 100 operating with non-tensioned patch cord fibers 80, according to some embodiments of the invention.

Figure 1A:
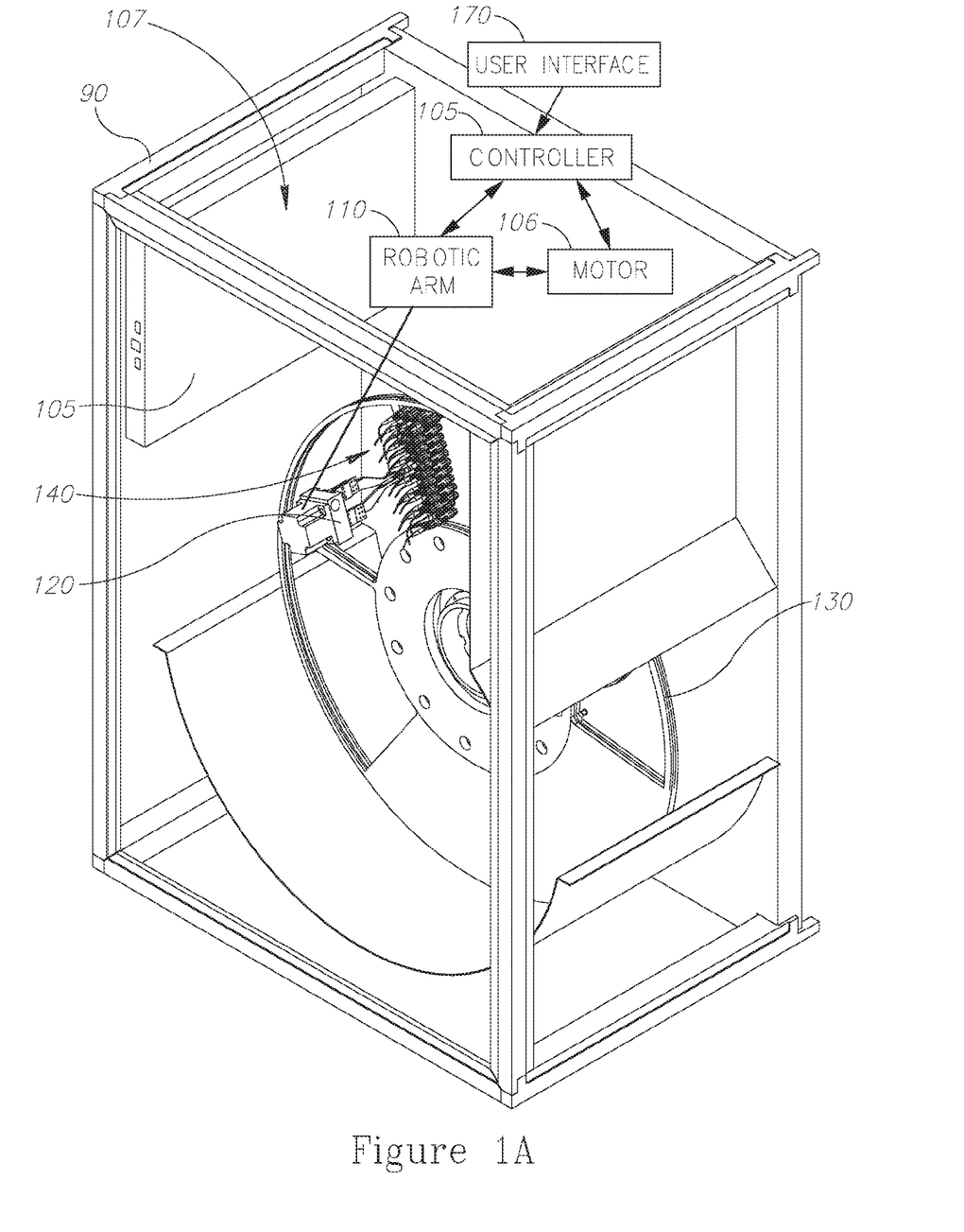
FIGS. 1A-1E are high level schematic illustrations of a fiber management system comprising a patch cord fiber switching system operating with non-tensioned patch cord fibers, according to some embodiments of the invention.
Figure 1B:
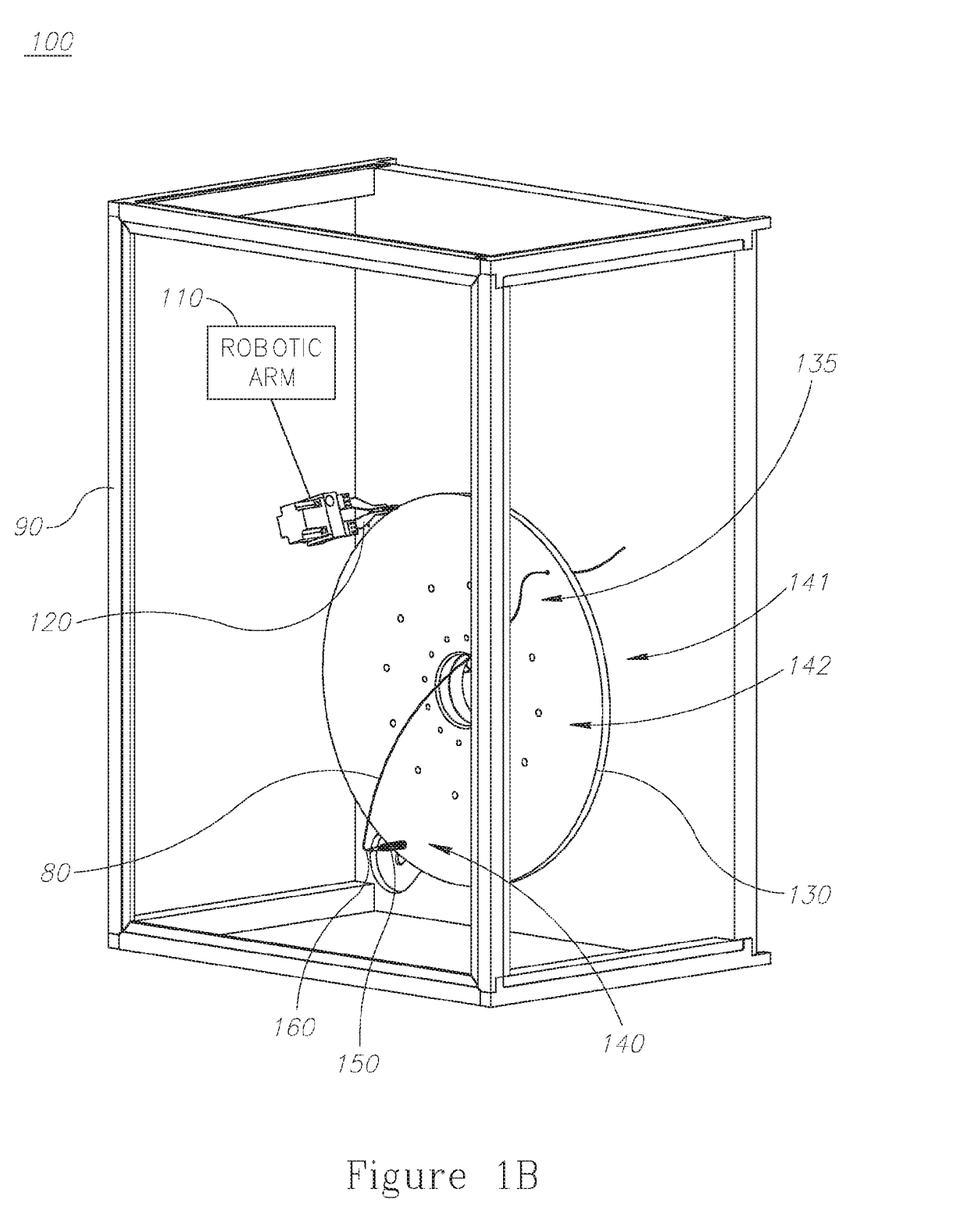
Figure 1C:
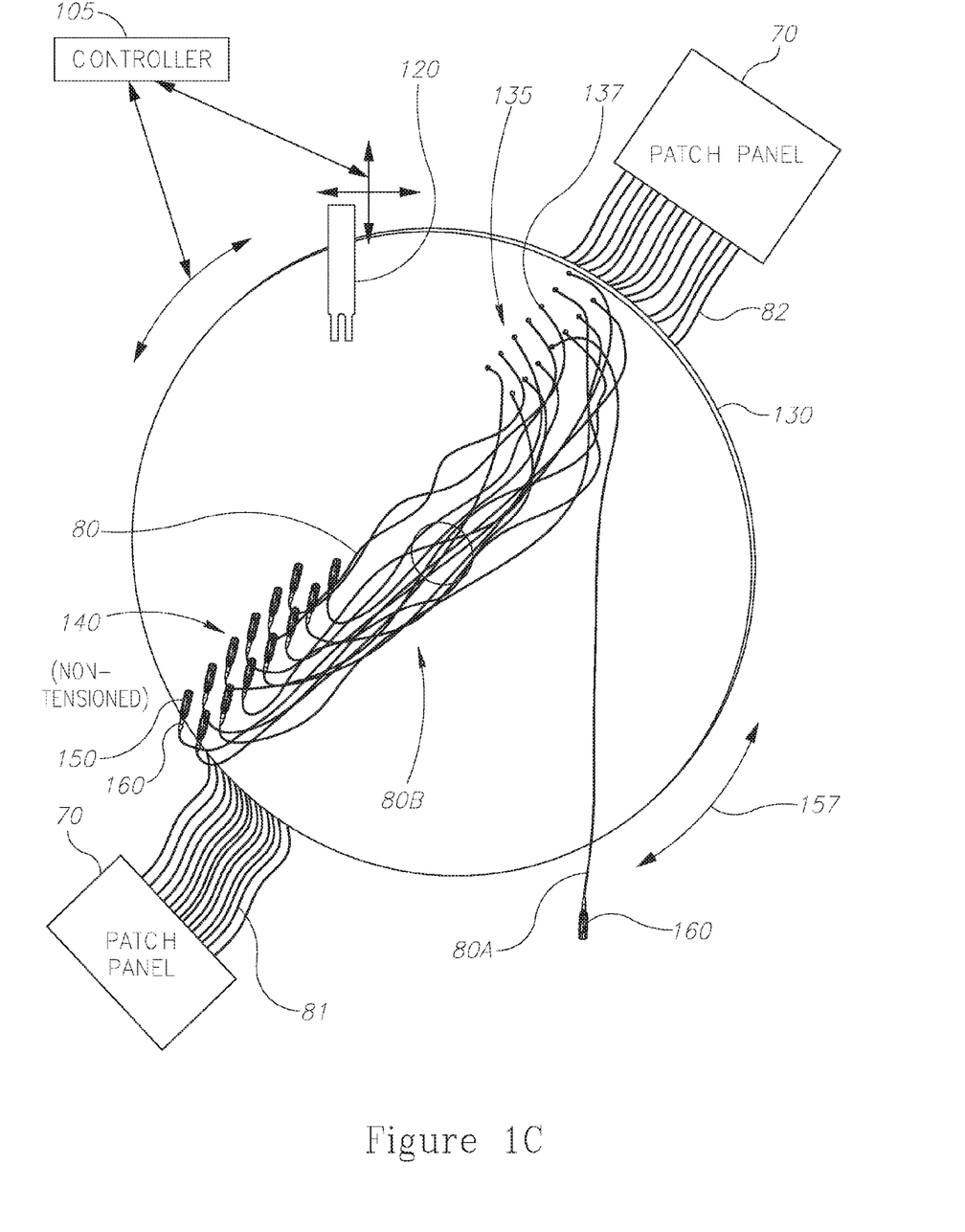

Fiber management system 95 comprises patch cord fiber switching system 100 held within a frame and chassis 90 and associated with a patch panel 70 (FIG. 1C). Patch cord fiber switching system 100 receives patch cord fibers 80 from patch panel 70 and delivers patch cord fibers 80 to patch panel 70. Associating received patch cord fibers with delivered patch cord fibers is carried out controllably by patch cord fiber switching system 100.

Uniquely, patch cord fiber switching system 100 handles non-tensioned patch cord fibers 80. This is in contrast with prior art systems that keep the patch cord fibers taut and depend on or manipulate in their operation the tension in the patch cord fibers. Keeping patch cord fibers 80 non-tensioned provides mechanical advantages and reduces patch cord fiber wear and tear. FIGS. 1A-1E illustrate the non-tensioned state of patch cord fibers 80.

Patch cord fiber switching system 100 comprises (FIG. 1A-1D, each illustrating some of the parts in patch cord fiber switching system 100) a cord support 130 comprising a plurality of adapters 150 (e.g. inserted in openings 152 in cord support 130) to which patch cord fiber connectors 160 are attached. Adapters 150 are organized in an adapter region 140 upon an operative face 142 (see FIGS. 1B, 1E) of cord support 130.

Patch cord fibers 80 are handled on operative face 142 of cord support 130, while incoming and outgoing cords from and to patch panel 70 are connected at a non-operative (i.e. un-switched) face. Handled patch cord fibers 80 may be physically different fibers from either incoming fibers 82 or outgoing fibers 81 (FIG. 1C), or may be a continuation of either of fibers 81, 82. Handling patch cord fibers 80 is carried out basically at two regions, as explained in detail below. Disconnecting and re-connecting patch cord fibers is carried out in adapter handling region 140 while distinguishing and disentangling the disconnected patch cord fiber (marked 80A) from the other patch cord fibers (marked 80B) is carried out in cord handling region 135 remote from connector 160. FIGS. 1A-1D illustrate an embodiment in which regions 140, 135 are on different sectors on a rotatable cord support 130, while FIG. 1E illustrates an embodiment in which regions 140, 135 are on separate parts 130A, 130B of the cord support.

FIGS. 1A-1D illustrate patch cord fiber switching system 100 with cord support 130 being a rotatable disc having an operative face 142 (and a non-operative face 141, FIG. 1B) with adapters 150 in a predefined adapter sector 140 thereon and fiber clamps 136 (or openings 137) at predefined cord handling sector 135. Fiber clamps 136 are arranged to let patch cord fibers 80 from patch panel 70 through openings in cord support 130 to from non operative face 141 to operative face 142. Auxiliary patch cord fibers 81 then connect adapters 150 to patch panel 70 over non-operative face 141.

Patch cord fiber switching system 100 further comprises a robotic unit 107 comprising a robotic arm 110 powered by a motor 106 and controlled by a controller 105 (having e.g. multi-axis motion, FIG. 1C, in additional to a motion vertical to support 130). Robotic arm 110, motor 106 and controller 105 are shown schematically and may be implemented by any mechanical and electronic configuration according to specified requirements concerning the required extent of movements as explained below. Robotic unit 107 is arranged to switch a specified patch cord fiber 80A from a first corresponding adapter 150 to a second specified adapter 150 (the first and second adapters are not shown explicitly in the figures). This is carried out by: (i) disconnecting a connector 160 of specified patch cord fiber 80A from a first corresponding adapter 150, (ii) distinguishing the disconnected patch cord fiber 80A, at a region 135 removed from connector 160, from other patch cord fibers 80B according to a position of patch cord fiber 80A in fiber management system 95, (iii) pulling the distinguished patch cord fiber 80A at the handling region to disentangle the pulled patch cord fiber 80A from the other patch cord fibers 80B and to receive and clasp the disconnected connector 160, and finally (iv) connecting the clasped connector 160 to a second specified adapter 150.

In embodiments, rotating rotatable cord support 130 may be used to alternately bring regions 140, 135 into the vicinity of robotic arm 110 and hence limit the required extent of movement of robotic arm 110. Moreover, in embodiments, pulling the distinguished patch cord fiber 80A may be carried out by rotating rotatable cord support 130 to yield movement of fiber 80A through a holder 125 until fiber 80A is clasped thereby.

Figure 1D:
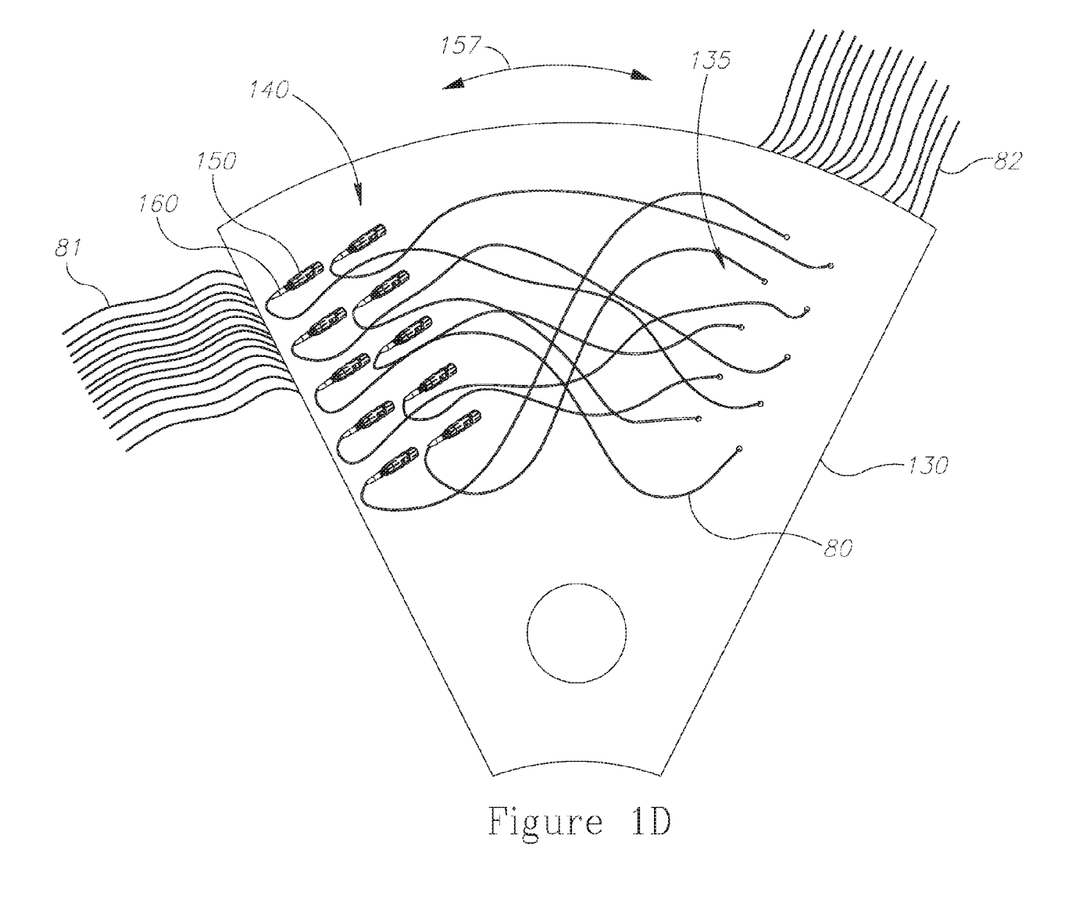
Figure 1E:
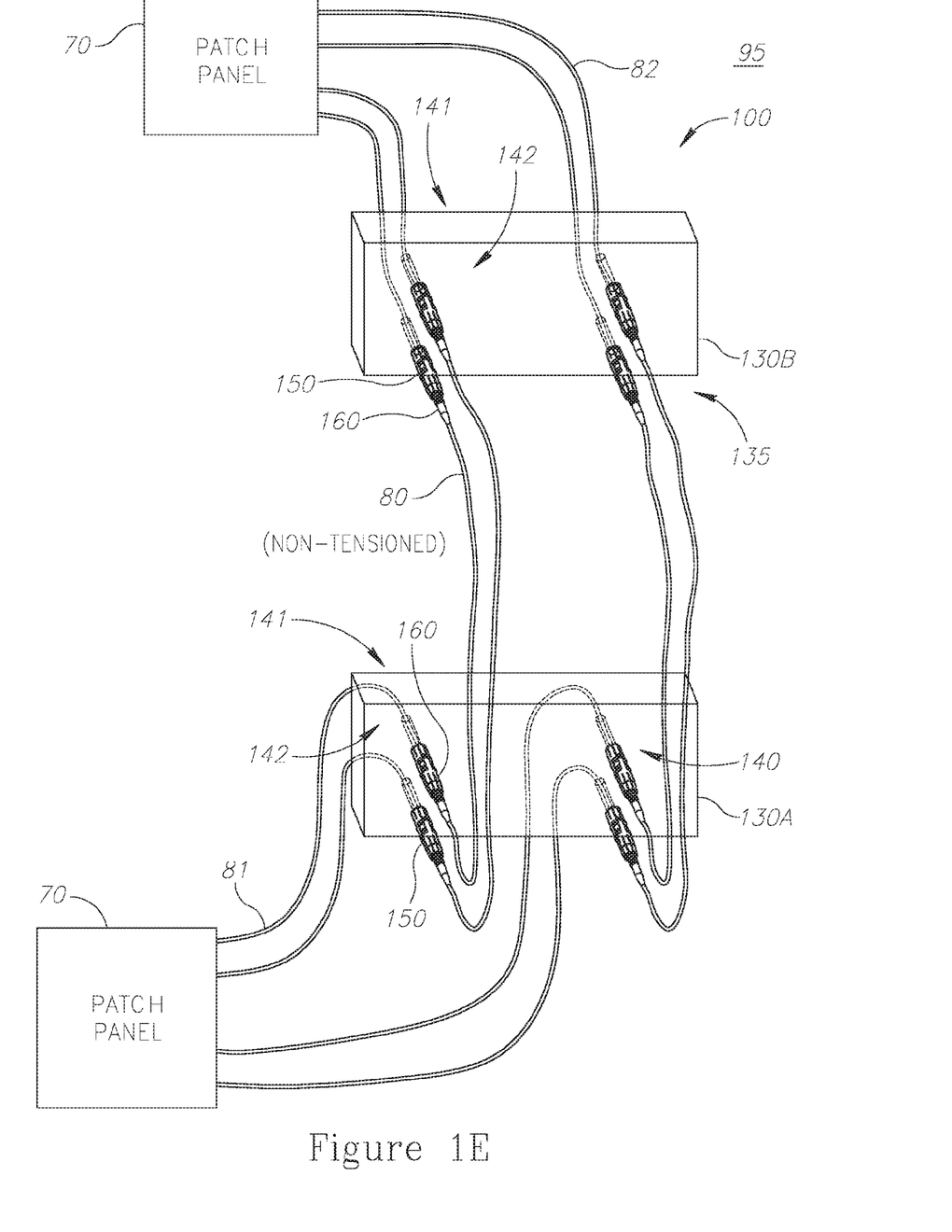
Figure 2A:
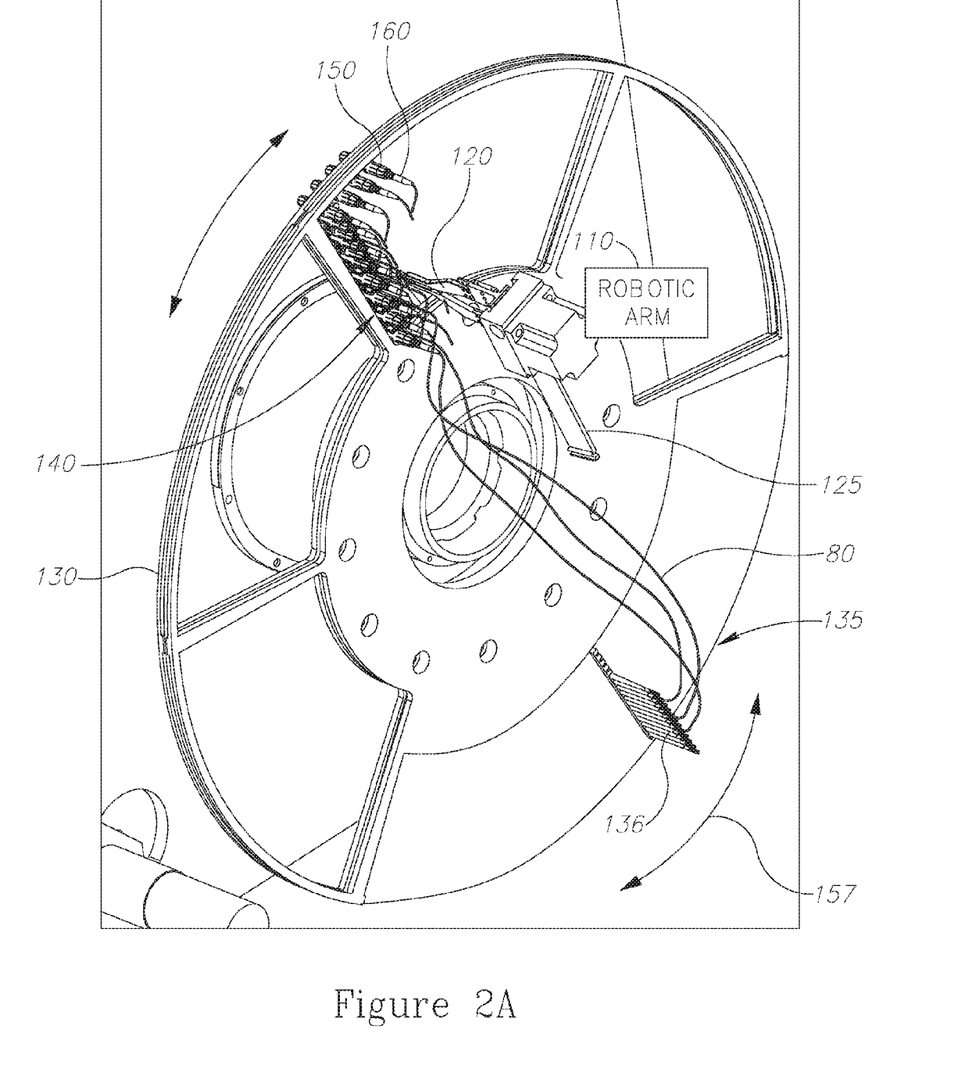
FIGS. 2A-2C and 3 are high level schematic illustrations of details of the patch cord fiber switching system and method, according to some embodiments of the invention.
Figure 2B:
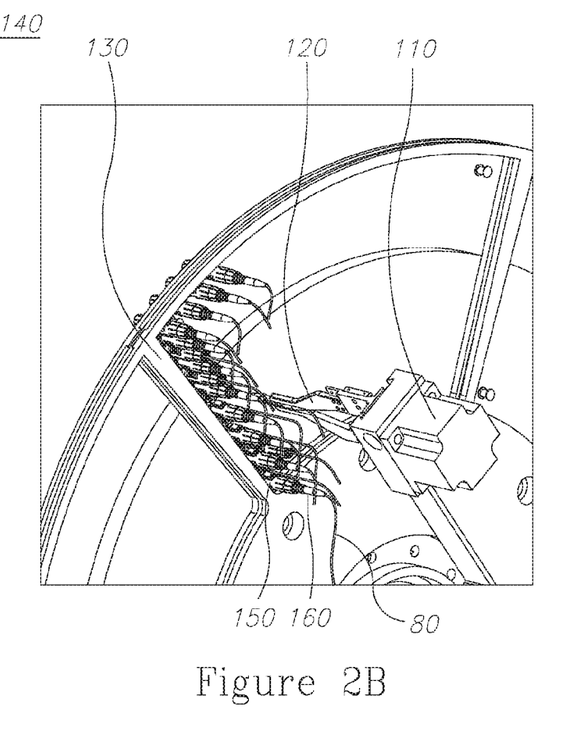
Figure 2C:
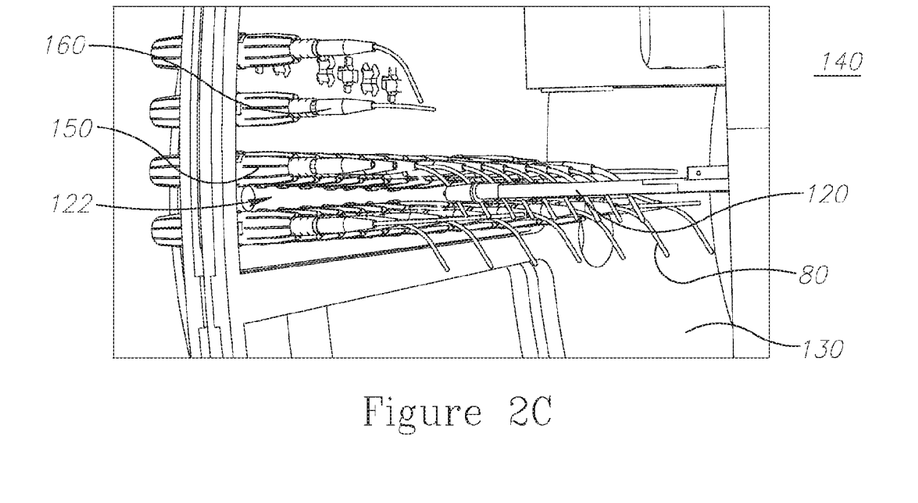
Figure 3:
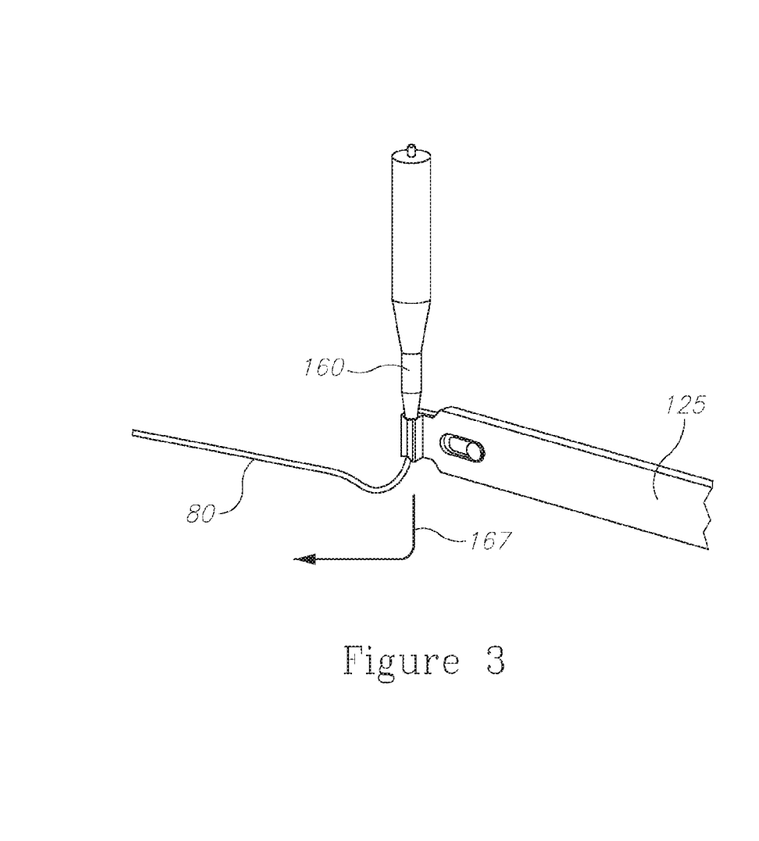

FIG. 1D schematically illustrates patch cord fiber switching system 100 with cord support 130 comprising a rotatable disc sector. The size of rotatable disc sector 130 may be selected according to the number of fibers 80 and spatial and mechanical requirements.

The extent of rotation 157 of cord support 130 may comprise rotation 157 between regions 140, 135 to alternately bring them into the vicinity of robotic arm 110. For example, with a disc shaped support 130 having opposite regions 140, 135, rotation 157 may comprise ±180°, ±200°, or a range between ±180° and ±240°. In embodiments, the extent of rotation 157 of cord support 130 may comprise a smaller rotation 157, e.g. when support 130 comprises a disc sector (as in FIG. 1D) rotation 157 may comprise about the sector angular extent.

FIG. 1D further illustrates an embodiment in which fibers 82 from patch panel 70 as well as fibers 82 to patch panel 70 are separate from manipulated patch cords 80. In this embodiment, patch cords 80 are only on operative face 142, and are connected via adapters 150 to fibers 81, 82.

In embodiments, client fibers may be directly connected to non-operative face 141 of support 130 as fibers 81 or 82. In such embodiments, patch panel 70 may be partial or missing. Possibly, client fibers may also be handled during the switching on operative face 142.

In embodiments, fibers from or to system 100 may be manipulated or only patch cords 80 may be manipulated, depending on system configuration and requirements. Either or both regions 135, 140 may comprise adapters 150, and patch cords 80 may have connectors 160 on either or both ends.

In embodiments, patch cord 80 may be of substantially the same length and thus require substantially identical handling. For example, patch cord length may diverge by no more than 10%. A rotatable cord support 130 may be particularly efficient in implementing system 100 with substantially identical patch cords. However, neither the equal length requirement nor the rotatability of support 130 are limiting the invention, which may be implemented with non-rotating supports 130 and/or with fibers of differing lengths.

FIGS. 2A-2C and 3 are high level schematic illustrations of details of patch cord fiber switching system 100 and method 200 (illustrated in FIG. 5), according to some embodiments of the invention. Upon switching a patch cord fiber, robotic unit 107 approaches and disconnects the respective connector 160 from first adapter 150. The location of connector 160 is known from the identity of patch cord fiber 80 and the approach may be carried out via paths 122 (FIG. 2C) between rows of adapters 150. Robotic arm 110 may have a gripper 120 that is appropriately designed to pass through paths 122 and clasp and disconnect connectors 160. For example, in a rectangular arrangement of adapters 150, paths 122 may be designed between adjacent parallel rows of adapters 150 (e.g. FIG. 1E). In a circular arrangement of adapters 150, paths 122 may be designed between adjacent radial rows of adapters 150 (e.g. FIG. 2A).

Connector 160 of disconnected patch cord fiber 80A (FIG. 1D) may be released by robotic arm 110 in order to disentangle patch cord fiber 80A from other patch cord fibers 80B. The disentanglement prevents continuous and potentially extensive enmeshing of patch cord fibers 80 upon successive switching operations.

Distinguishing the disconnected patch cord fiber 80A from other patch cord fibers 80B, at region 135 removed from connector 160 may be carried out according to the position of corresponding fiber clamp 136, which is known from the identity of patch cord fiber 80A and its position in fiber management system 95. Handling region 135 is located before patch cord fiber entanglement region and may be cord handling sector 135 on operative face 142.

The actual disentanglement of patch cord fiber 80A may be carried out by pulling it out of the mesh created by other patch cord fibers 80B. Pulling may be carried out in various manners, such as by a pulling arm 125 illustrated in FIG. 3 or any other pulling appliance(s) associated e.g. with fiber clamps 136. Pulling arm 125 may be part of robotic unit 107 and controlled by controller 105. Pulling arm 125 may be identical to or cooperate with robotic arm 110. In embodiments, connector 160 may be designed to easily pass through patch cord fibers 80B, e.g. patch cord fiber top may be tapered, e.g. conical.

In embodiments, robotic unit 107 may be arranged to perform the disconnecting and the connecting at adapter handling region 140 and to perform the distinguishing and the pulling at cord handling region 135. Controller 105 may be arranged to rotate (157) cord support 130 (e.g. a disc) to match at least partially adapter handling region 140 and cord handling region 135. Pulling disconnected patch cord fiber 80A (in pulling direction 167) may be carried out until connector 160 is reached and clasped, and paths 122 may be used to connect connector 160 to second adapter 150. In embodiments, pulling 167 may be carried out by rotating rotatable support 130 by controller 105 to pull distinguished patch cord fiber 80A through pulling arm 125 of robotic unit 107. In such embodiments, pulling arm 125 is only to be placed to encircle the corresponding patch cord fiber 80A and the actual pulling is carried out by simply rotating disc 130.

In embodiments, fiber management system 95 comprises patch cord fiber switching system 95 having rotatable cord support 130 (e.g. disc shaped) comprising a plurality of adapters 150, radially arranged on operative face 142 of rotatable cord support 130 and a plurality of radially arranged openings 137 (e.g. equipped with clamps 136) through rotatable cord support 130. Patch cord fiber switching system 95 further comprises a plurality of non-tensioned patch cord fibers 80 passing through openings 137 to operative face 142 and having connectors 160 connected to adapters 150 in rotatable cord support 130. Patch cord fiber switching system 95 further comprises robotic unit 107 arranged to disconnect a selected connector 160 of corresponding patch cord fiber 80A from corresponding first adapter 150, as indicated e.g. via a user interface 170 arranged to receive patch cord fiber selections and target adapters therefor (e.g. user interface 170 may be associated with patch panel 70). Robotic unit 107 is further arranged to distinguish the disconnected patch cord fiber at corresponding opening 137 and pull the distinguished patch cord fiber to disentangle the pulled patch cord fiber from the other patch cord fibers and to receive and clasp disconnected connector 160. Finally, robotic unit 107 is further arranged to connect clasped connector 160 to target adapter 150 (e.g. as indicated via user interface 170). Fiber management system 95 may further comprise patch panel 70 from which patch cord fibers 80 originate and to which adapters 150 are connected via auxiliary cords 81.

In embodiments with vertical rotatable cord support 130, connecting patch cord fiber 80A may be carried out to place connected patch cord fiber 80A on top of other patch cord fibers 80B and thus to reduce over time the degree of enmeshing of patch cord fibers 80 or eliminate any enmeshing of fibers 80. In embodiments, system 100 may be initialized with all patch cord fibers 80 lain upon each other without any enmeshing, and by the described operation, no entanglement is created by the fiber manipulation. In such case, pulling the distinguished patch cord fiber 80A at handling region 135 to disentangle the pulled patch cord fiber 80A from the other patch cord fibers 80B may comprise just the pulling fiber 80B out of the pile of fibers 80A lain upon one another.

Figure 4:
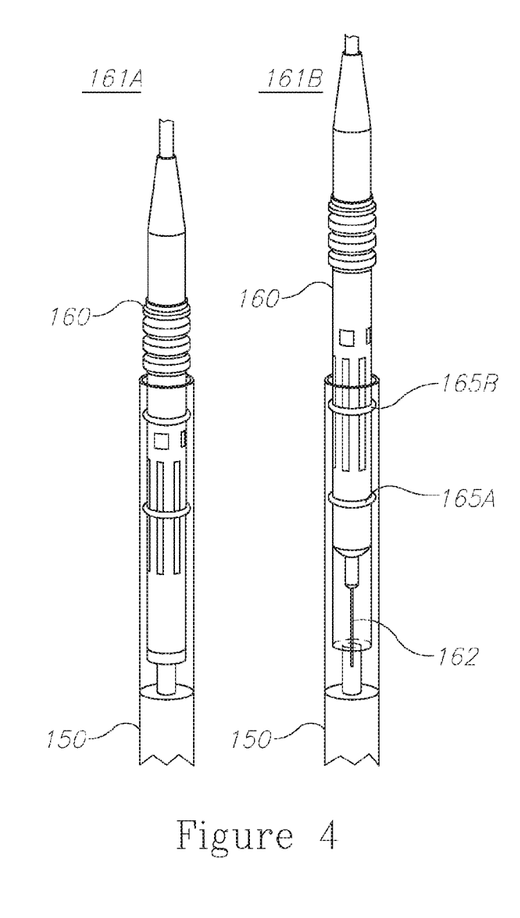
FIG. 4 is a high level schematic illustration of two connection states, according to some embodiments of the invention.

FIG. 4 is a high level schematic illustration of two connection states 161A, 161B, according to some embodiments of the invention. In a fully connected state 161A connector 160 is completely engaged (the connector latches are in their corresponding recesses 165A, 165B) in adapter 150 and all radiation from patch cord fiber 80 passes on through to corresponding auxiliary patch cord fiber 81 (see FIG. 1D). In a partially connected state 161B connector 160 is only partially engaged in adapter 150 and radiation 162 from patch cord fiber 80 does not reach corresponding auxiliary patch cord fiber 81. Adapters 150 and connectors 160 are arranged to have fully engaged state 161A and partially engaged state 161B, in the latter of which connector 160 is mechanically but not optically engaged to adapter 150. Connectors 160 and adapters 150 may be designed to support parking position 161B of connector 160 at adapter 150 itself. Connector 160 may be designed to have a special angled latch position that prevents connector 160 to transfer data from fiber to fiber (e.g. 80A to 81) via corresponding adapter 150. Connector 160 may be designed to support at least some of the following requirements: Standard connector regarding the main optical components; enabling robotic handling; perform parking state 161B and have a smooth shape to pass between fibers, e.g. an apically tapered shape. Connector 160 may be designed to optimize its handing by robotic unit 107 and in particular by gripper 120 and pulling arm 125. Connector 160 may have a simpler design than a connector designed for a purely manual manipulation. Clearly, connector 160 may still allow manual handling.

Connector 160 and adapter 150 may be arranged to have two (or more) mechanical connection states with different optical connection states, namely one mechanical connection state in which the fibers are optically connected and another mechanical connection state in which the fibers are not or partially optically connected. Additional connector features may comprise a simple structure, namely a conical holder of the fiber ferrule, and adapter 160 may comprise a floating sub-assembly with passive latching for allowing a safe and efficient robotic connection of connector 150 to adapter 160.

Figure 5:
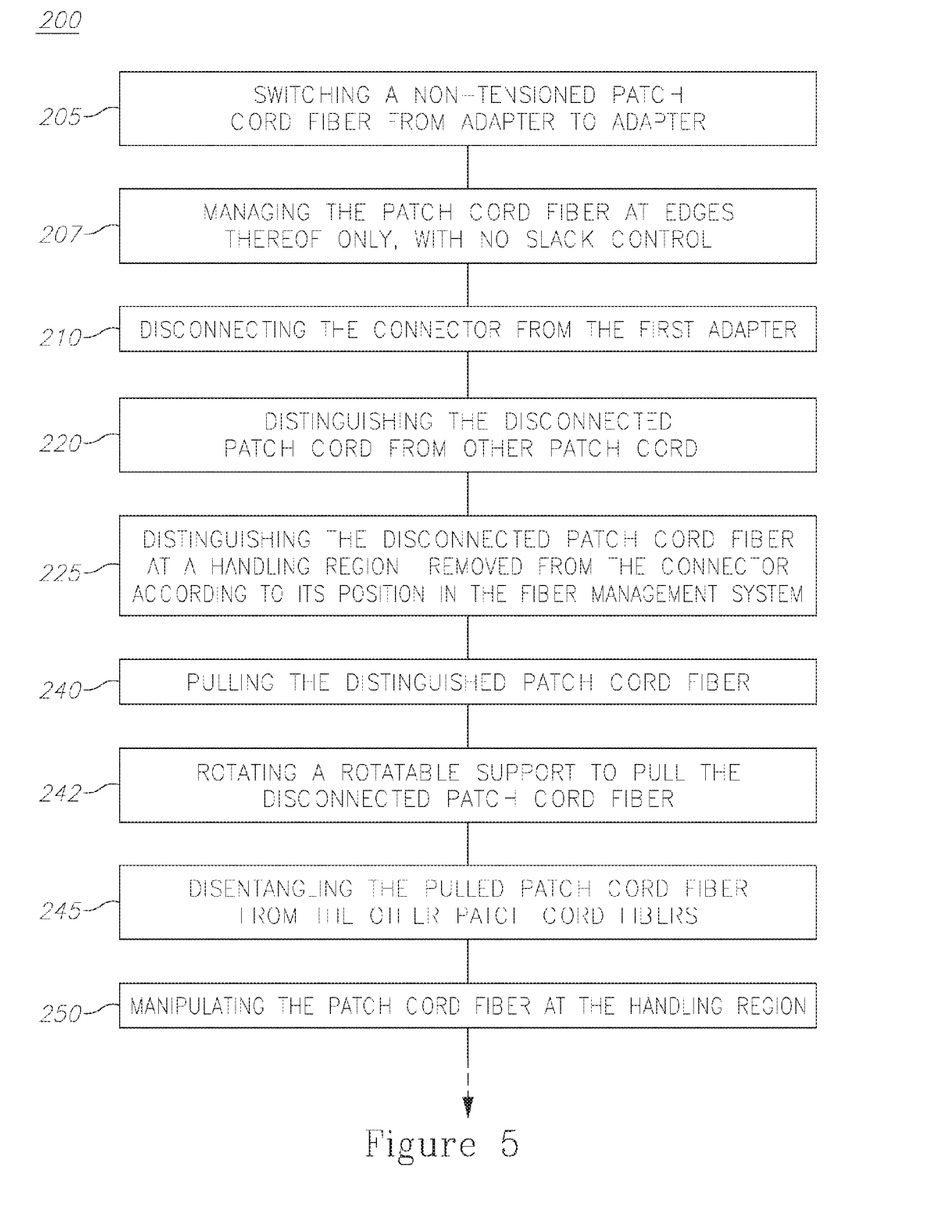
FIG. 5 is a high level schematic flowchart illustrating a patch cord fiber switching method, according to some embodiments of the invention.

FIG. 5 is a high level schematic flowchart illustrating a patch cord fiber switching method 200, according to some embodiments of the invention. Method 200 switches, from a first adapter to a second adapter, non-tensioned patch cord fibers (stage 205) in a fiber management system having a plurality of non-tensioned patch cord fibers having connectors connected at adapters. Advantageously, method 200 comprises managing the patch cord fibers at edges thereof only, with no slack control (stage 207).

Method 200 comprises the following stages: disconnecting the connector of the switched patch cord fiber from the first adapter (stage 210); distinguishing the disconnected patch cord fiber (stage 220), e.g. at a handling region removed from the connector, from other patch cord fibers according to a position of the patch cord fiber in the fiber management system (stage 225); pulling the distinguished patch cord fiber (stage 240) at the handling region to receive 252 and clasp 254 the disconnected connector, wherein the pulling is carried out to disentangle the pulled patch cord fiber from the other patch cord fibers (stage 245) e.g. to position the disconnected patch cord fiber upon the other patch cord fibers (stage 256) and wherein the patch cord fiber may be manipulated at the handling region (stage 250); and connecting the clasped connector to the second adapter (stage 260).

In embodiments having a vertical rotatable support, connecting 260 may be carried out to place the connected patch cord fiber on top of the other patch cord fibers.

In embodiments, connecting 260 may establish a partial or a full optical connection to the target adapter (stage 265). The connector and the adapter may be arranged to have two (or more) mechanical connection states with different optical connection states, namely one mechanical connection state in which the fibers are optically connected and another mechanical connection state in which the fibers are not or partially optically connected.

Method 200 may further comprise any of: rotating a rotatable support such as a disc holding the adapters to pull the disconnected patch cord fiber (stage 242) and/or to match the adapter handling region and the cord handling region (stage 270), moving through paths between radially arranged adapters to reach a specified adapter (stage 280) and moving through paths between radially arranged opening for patch cord fibers, to reach a specified patch cord fiber (stage 285).

Systems 95 and 100 and method 200 may be implemented as a vertical automatic connecting system based on a vertical rotating disc 130 with connector adapters arrange at outer sectors of the disc. Patch cord fibers 80 may lie one on the other and whole the bundle lies (due to gravity) on the side of disc 130. The upper side of disc 130 may contain robotic unit 107 for handling patch cord fiber routing. Disc 130 may rotate (e.g. ±200°) with the connected patch cord fibers 80, synchronized with gripper 120 and robotic arm 110. In embodiments, controller 105 controls both robotic arm 110 with gripper 120 and disc rotations (FIG. 1D). System 100 and gripper 120 may be designed to handle any type or multiple types of connectors and adapters, such as MU, MPO, MU-Duplex, MTP and FZ, as well as specially designed connectors. Advantageously, systems 95 and 100 and method 200 can be configured to handle any type of connector and connector-adapter combinations, in particular simply structured connectors 160.

Figure 6:
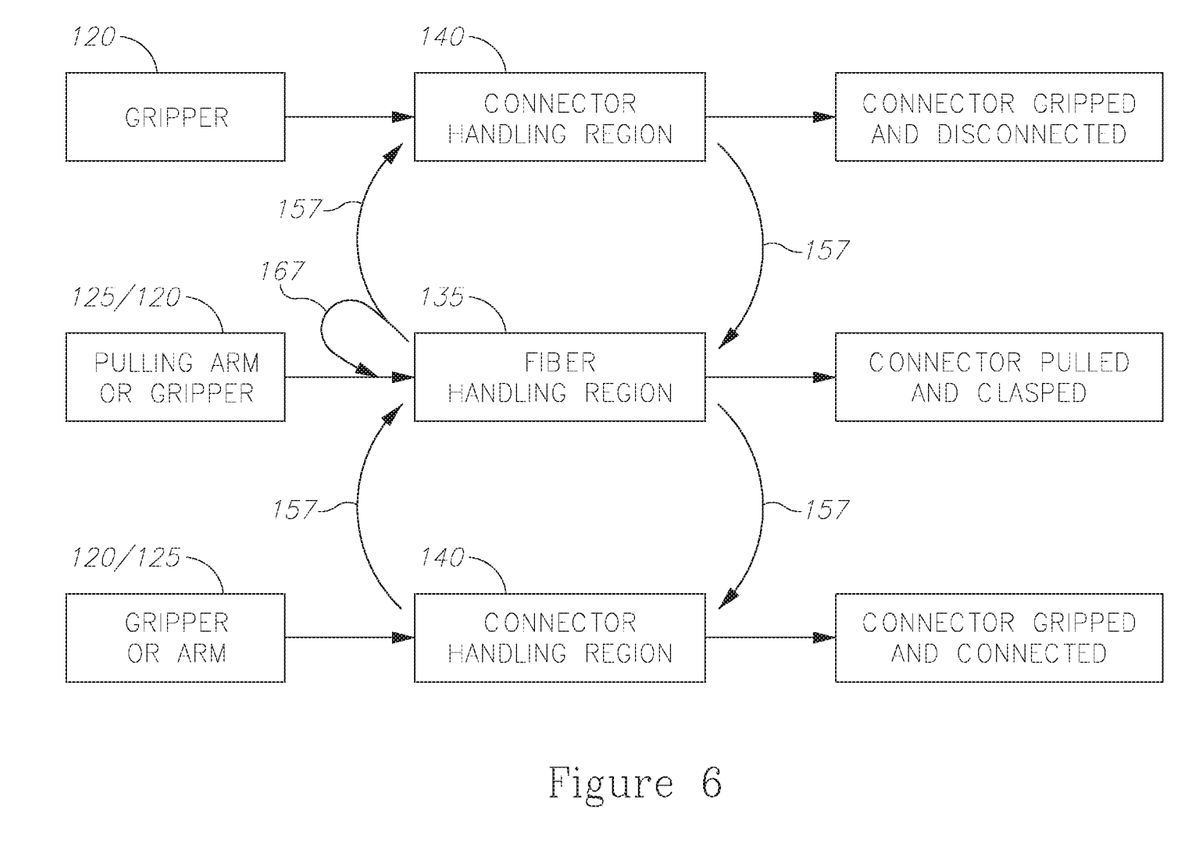
FIG. 6 is a high level schematic illustration of the operation of the system, according to some embodiments of the invention.

FIG. 6 is a high level schematic illustration of the operation of system 100, according to some embodiments of the invention. First, gripper 120 moves in connector handling region 140 to grip and disconnect connector 150. In a non-limiting example, disconnecting the connector of the switched patch cord fiber from the first adapter (stage 210) may be carried out by rotating disc 130 until target connector's path 122 is in front of gripper 120; moving robotic arm 110 through path 122 until it reaches target connector 160; rotating disc 130 a small step to move target connector 160 to a position between gripper 120's fingers; closing gripper 120's fingers to grab connector 160 and pull it out of adapter 150. When connector 160 is out of the fibers bundle the gripper's fingers are opened to release connector 160 on top of the patch cord fiber bundle. Alternatively, connector 160 may be released after disconnection from adapter 150.

Then, pulling arm 125 may be set to enclose fiber 80A and allow free motion of fiber 80A through pulling arm 125. By rotating 157 of disc 130 fiber 80A may be pulled through pulling arm 125 until connector 160 is clasped thereby. Alternatively, gripper 120 may replace pulling arm, namely gripper 120 may be set to enclose fiber 80A and allow free motion of fiber 80A through gripper 120. By rotating 157 of disc 130 fiber 80A may be pulled through gripper 120 until connector 160 is clasped thereby. In a non-limiting example, distinguishing the disconnected patch cord fiber (stage 220) is carried out by rotating disc 130 until pulling arm 125 or gripper 120 reach target fiber 80A, e.g. via paths similar to paths 122. In a non-limiting example, pulling the distinguished patch cord fiber (stage 240) is carried out by closing the fingers of puller arm 125 or gripper 120 to clasp patch cord fiber clamp 136. Then, in a synchronized motion of the disc rotation and robotic arm movement, patch cord fiber 80A may be pulled 167 out of patch cord fiber bundle until connector 160 is trapped at puller arm 125 or gripper 120's fingers. In the former case, puller arm 125 may insert pulled connector 160 into adapter 150, and gripper 120 of robotic arm may grab connector 160 and connect the clasped connector to the second adapter (stage 260), using a procedure similar to the disconnecting procedure described above (rotating disc 130 until the appropriate path is in front of gripper 120, moving gripper 120 with connector 160 through path 122 until it reaches a position next to second adapter 150 and rotating disc 130 a step to place connector 160 in front of second adapter 150. The gripper inserts connector 130 fully or partially into adapter 150).

In FIG. 6, when pulling and clasping connector 160 are carried out by gripper 120, gripper 120 also re-connects connector 160 into adapter 150. If pulling and clasping connector 160 are carried out by pulling arm 125, either pulling arm 125 or gripper 120 may be used to reconnect connector 160.

Gripper 120 and puller arm 125 may be designed to pull connector 160 and patch cord fiber 80A smoothly to protect the fiber of patch cord fiber 80 and the design of connector 160 also prevents large forces from being applied to the fiber.

In embodiments, system 100 may comprise multiple grippers 120, robotic arms 110 or robotic units 107 in order to handle more fibers 80 or accelerate fiber handling and expedite connection time.

Unexpectedly and advantageously, systems 95 and 100 and method 200 handle only the patch cord fiber edges (i.e. connector and handling region in which patch cord fiber 80A is distinguished and pulled) and do not manage patch cord fibers 80 themselves. This is in sharp contrast to prior art systems which rout and manage the patch cord fibers, and in particular keep them constantly under tension. In the current invention, patch cord fibers 80 are enmeshed in an unordered bundle, and systems 95 and 100 and method 200 only take care to limit the degree of meshing together of patch cord fibers 80 by disentangling each handled patch cord fiber 80 during its handling. Moreover, in contrast to prior art systems, the current invention dismisses with a slack management mechanism for controlling the entirety of the patch cord fiber length in order to maintain predefined tension and position of each patch cord fiber. (In prior art systems, the slack management mechanism involves a special fiber tensioning that applies stress on the fiber, fiber movement to keep the tension, a complex robot to handle fiber tensioning, external slack mechanism to handle fiber tensioning and the fiber slack handling is complex so it reduces the complete system reliability.) Finally, robotic unit 107 is much simpler than in prior art systems, due to handling edges instead of whole patch cord fibers. An additional advantage is the higher flexibility with respect to connector types, as connectors 160 must only be designed to be gripes and pulled through the fiber bundle rather than be adapted to comply to the slack management mechanism as well as human handling and manual manipulations.

In the above description, an embodiment is an example or implementation of the invention. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Embodiments of the invention may include features from different embodiments disclosed above, and embodiments may incorporate elements from other embodiments disclosed above. The disclosure of elements of the invention in the context of a specific embodiment is not to be taken as limiting their used in the specific embodiment alone.

Furthermore, it is to be understood that the invention can be carried out or practiced in various ways and that the invention can be implemented in embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method of switching, from a first adapter to a second adapter, a patch cord fiber in a fiber management system having a plurality of non-tensioned patch cord fibers, the patch cord fiber having a connector connected at the first adapter, the method comprising:
   disconnecting the connector from the first adapter;
   distinguishing the disconnected patch cord fiber, at a handling region removed from the connector, from other patch cord fibers according to a position of the patch cord fiber in the fiber management system;
   pulling the distinguished patch cord fiber at the handling region to receive and clasp the disconnected connector, wherein the pulling is carried out to disentangle the pulled patch cord fiber from the other patch cord fibers; and
   connecting the clasped connector to the second adapter wherein the method is carried out by a robotic unit, and wherein the disconnecting and the connecting are carried out at an adapter handling region and the distinguishing and the pulling are carried out at a cord handling region.

2. The method of claim 1, wherein the connecting comprises establishing a partial or a full connection of the clasped connector to the second adapter.

3. The method of claim 1, wherein the adapter handling region and the cord handling region are located on a rotatable support, and the method further comprises rotating the rotatable support to at least partially match the adapter handling region and the cord handling region.

4. The method of claim 1, wherein the adapter handling region and the cord handling region are located on a rotatable support, and the method further comprises rotating the rotatable support to carry out the pulling.

5. The method of claim 1, wherein the adapter handling region and the cord handling region are located on a vertical rotatable support, and the connecting is carried out to place the connected patch cord fiber on top of the other patch cord fibers.

6. The method of claim 1, further comprising approaching specific adapters through paths between radially arranged adapters.

7. The method of claim 1, further comprising approaching specific patch cord fibers at the handling region through paths between radially arranged patch cord fiber positions.

8. A patch cord fiber switching system comprising:
   a cord support comprising a plurality of adapters;
   a robotic unit comprising a robotic arm and a controller thereof, arranged to:
      disconnect a connector of a patch cord fiber from a first adapter, the patch cord fiber one of a plurality of non-tensioned patch cord fibers in a fiber management system;
      distinguish the disconnected patch cord fiber, at a handling region removed from the connector, from other patch cord fibers according to a position of the patch cord fiber in the fiber management system;
      pull the distinguished patch cord fiber at the handling region to disentangle the pulled patch cord fiber from the other patch cord fibers and to receive and clasp the disconnected connector; and
      connecting the clasped connector to a second adapter,
   wherein the robotic unit is arranged to perform the disconnecting and the connecting at an adapter handling region and to perform the distinguishing and the pulling at a cord handling region.

9. The patch cord fiber switching system of claim 8, wherein:
   the cord support is a rotatable disc having an operative face with the adapters in a predefined adapter sector thereon, the disc further comprising a predefined cord sector arranged to let the patch cord fibers through openings in the disc to the operative face; and
   the handling region is the cord sector on the operative face.

10. The patch cord fiber switching system of claim 9, wherein the controller is further arranged to rotate the disc to match at least partially the adapter handling region and the cord handling region.

11. The patch cord fiber switching system of claim 9, wherein the controller is further arranged to rotate the disc to pull the distinguished patch cord fiber through a pulling arm of the robotic unit.

12. The patch cord fiber switching system of claim 9, wherein the adapters are positioned in the adapter handling sector in a radial manner, leaving paths between adjacent radial rows of adapters, and wherein the robotic unit is arranged to move the robotic arm through the paths to disconnect and to connect respective connectors.

13. The patch cord fiber switching system of claim 9, wherein the openings are positioned in the cord handling sector in a radial manner, leaving paths between adjacent radial rows of openings, and wherein the robotic unit is arranged to move the robotic arm through the paths to distinguish and to pull respective cords.

14. The patch cord fiber switching system of claim 9, wherein the rotatable disc is vertically positioned and the connecting is carried out to place the connected patch cord fiber on top of the other patch cord fibers.

15. A fiber management system comprising:

a rotatable cord support comprising a plurality of adapters, radially arranged on an operative face of the rotatable cord support, and a plurality of radially arranged openings through the rotatable cord support;

a plurality of non-tensioned patch cord fibers passing through the openings to the operative face and having connectors connected to the adapters in the rotatable cord support; and a robotic unit comprising a robotic arm and a controller thereof, arranged to:

disconnect a selected connector of a corresponding patch cord fiber from a corresponding first adapter;

distinguish the disconnected patch cord fiber at the corresponding opening;

pull the distinguished patch cord fiber to disentangle the pulled patch cord fiber from the other patch cord fibers and to receive and clasp the disconnected connector; and connecting the clasped connector to a target adapter.

16. The fiber management system of claim 15, further comprising a user interface arranged to receive patch cord fiber selections and target adapters therefor.

17. The fiber management system of claim 15, further comprising a patch panel from which the patch cord fibers originate and to which the adapters are connected via auxiliary cords.

18. The fiber management system of claim 15, wherein the robotic unit is arranged to perform the disconnecting and the connecting at an adapter handling region and to perform the distinguishing and the pulling at a cord handling region.

19. The fiber management system of claim 18, wherein the rotatable cord support is a disc controlled by the controller, which is further arranged to rotate the disc to match at least partially the adapter handling region and the cord handling region.

20. The fiber management system of claim 15, wherein the adapters and the connectors are arranged to have a fully engaged state and a partially engaged state in which the connector is mechanically but not optically engaged to the adapter.

* * * * *